(12) United States Patent
Wong et al.

(10) Patent No.: US 11,093,354 B2
(45) Date of Patent: Aug. 17, 2021

(54) COGNITIVELY TRIGGERING RECOVERY ACTIONS DURING A COMPONENT DISRUPTION IN A PRODUCTION ENVIRONMENT

(71) Applicant: International Business Machines Corporation, Armonk, NY (US)

(72) Inventors: Kim Poh Wong, Singapore (SG); Diego Sonvico, Singapore (SG); Christopher Orfanos, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/135,435

(22) Filed: Sep. 19, 2018

(65) Prior Publication Data
US 2020/0089586 A1 Mar. 19, 2020

(51) Int. Cl.
*G06F 11/00* (2006.01)
*G06F 11/20* (2006.01)
(Continued)

(52) U.S. Cl.
CPC ......... *G06F 11/2025* (2013.01); *G06N 7/005* (2013.01); *G06N 20/00* (2019.01); *H04L 41/5054* (2013.01); *H04L 69/40* (2013.01)

(58) Field of Classification Search
CPC ...... G06F 11/2025; G06F 11/16; G06F 11/20; G06F 11/202; G06F 11/2023; G06F 11/203; G06F 11/2033; G06F 11/2257; G06F 11/2263; G06N 20/00; G06N 20/10; G06N 20/20; G06N 7/005; G06N 7/02; G06N 7/023; G06N 7/046; H04L 41/5054; H04L 41/06; H04L 41/0654; H04L 69/40; H04L 45/28; H04L 49/557; H04L 67/1034; H04L 67/1248; H04L 67/2861

See application file for complete search history.

(56) References Cited

U.S. PATENT DOCUMENTS 8,688,850 B2 4/2014 Branson et al.
9,430,337 B1 8/2016 Gupta et al.
(Continued)

FOREIGN PATENT DOCUMENTS

WO WO2016053823 4/2016
WO WO-2017165774 A1 * 9/2017 ......... G06F 16/3347

*Primary Examiner* — Anthony J Amoroso
(74) *Attorney, Agent, or Firm* — Schmeiser, Olsen & Watts, LLP; William Hartwell

(57) ABSTRACT

A system and method for triggering a recovery action during a component disruption in a production environment includes receiving data inputs from a plurality of components comprising the production environment, detecting an abnormality associated with a component of the plurality of components by analyzing the data inputs, and in response to the detecting the abnormality, triggering an analysis of the abnormality, analyzing the abnormality using a plurality of artificial intelligence engines to determine a plurality of outcomes from each artificial engine, consolidating the plurality of outcomes into a single outcome, the single outcome being input into an annotator engine to determine the recovery action to take during the component disruption in the production environment, and implementing the recovery action specific to the component with the detected abnormality.

17 Claims, 7 Drawing Sheets

(51) Int. Cl.
*H04L 12/24* (2006.01)
*G06N 7/00* (2006.01)
*H04L 29/14* (2006.01)
*G06N 20/00* (2019.01)

(56) References Cited

U.S. PATENT DOCUMENTS

| | | | |
|---|---|---|---|
| 10,467,261 B1* | 11/2019 | Doyle | G06F 16/248 |
| 2016/0092322 A1* | 3/2016 | Nosov | H04L 41/0663 |
| | | | 714/4.11 |
| 2017/0060608 A1 | 3/2017 | Raghunathan et al. | |
| 2019/0065589 A1* | 2/2019 | Wen | G06F 16/35 |

* cited by examiner

COGNITIVELY TRIGGERING RECOVERY ACTIONS DURING A COMPONENT DISRUPTION IN A PRODUCTION ENVIRONMENT

TECHNICAL FIELD

The present invention relates to systems and methods for cognitively triggering recovery action decisions in a production environment, and more specifically the embodiments of a recovery action system for triggering a recovery action during a component disruption in a production environment.

BACKGROUND

When a component disruption occurs in a production environment, a time-critical decision must be made by human managers as to whether one or more components should failover to an alternative disaster recovery site

SUMMARY

An embodiment of the present invention relates to a method, and associated computer system and computer program product for triggering a recovery action during a component disruption in a production environment. A processor of a computing system receives data inputs from a plurality of components comprising the production environment. An abnormality associated with a component of the plurality of components is detected by analyzing the data inputs, and in response to the detecting the abnormality, an analysis of the abnormality is triggered. The abnormality is analyzed using a plurality of artificial intelligence engines to determine a plurality of outcomes from each artificial engine. The plurality of outcomes are consolidated into a single outcome, the single outcome being input into an annotator engine to determine the recovery action to take during the component disruption in the production environment. The recovery action specific to the component with the detected abnormality is implemented.

DETAILED DESCRIPTION

Figure 1:
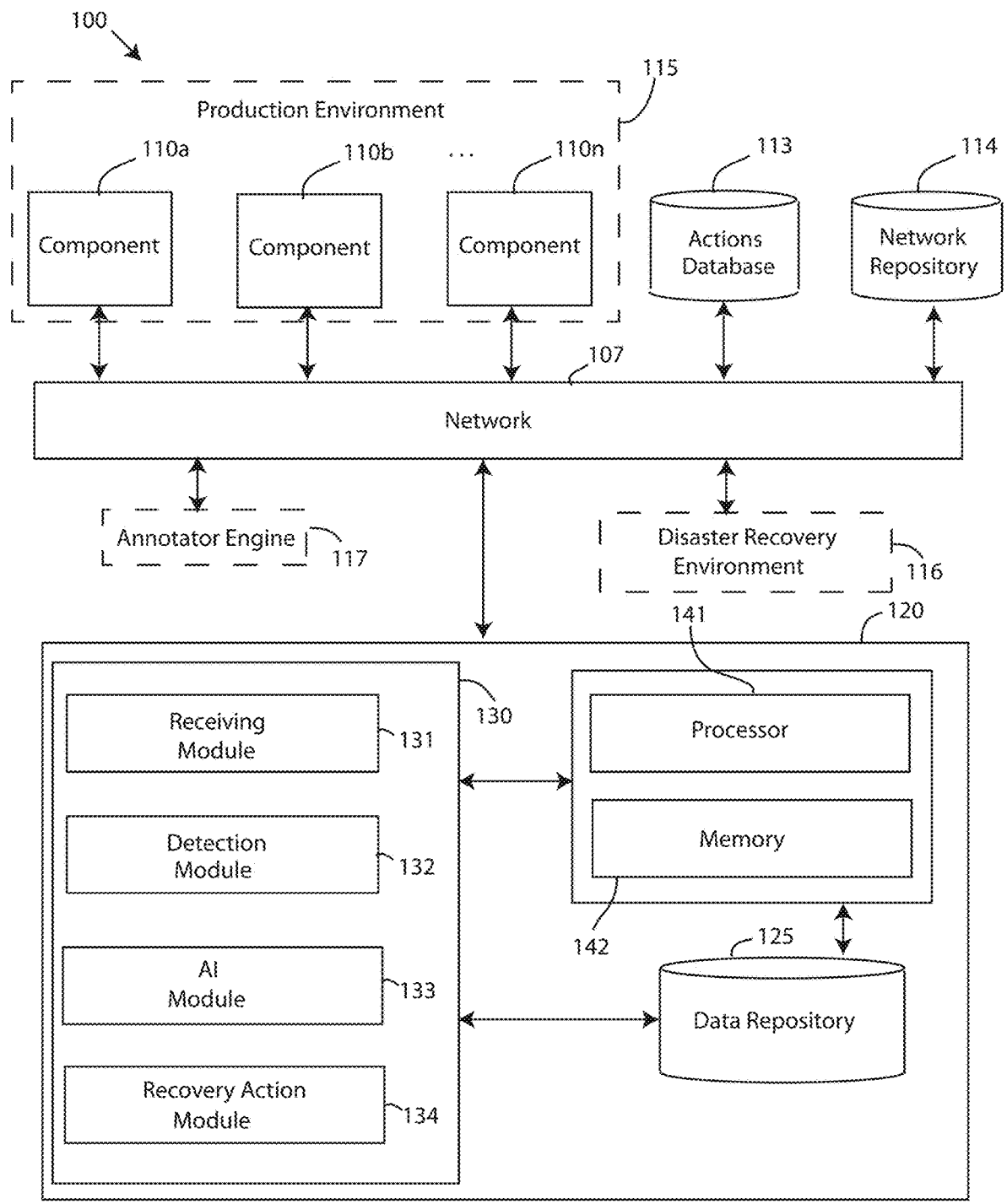
FIG. 1 depicts a block diagram of a recovery action system, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

In brief overview, embodiments of the present invention resolve issues by deciding whether components should be failed over to an alternate site during a disruption within a production environment. The failover decision is part of a recovery action that can be taken based on determined outcomes that have been analyzed by artificial intelligence engines and input into an annotator engine. The artificial intelligence engines are different mathematical formulas having artificial intelligence tools to help determine what recovery actions need to be done when a disruption is detected in the production environment. The artificial intelligence engines each calculate a probability of an outcome, and the outcomes from the artificial intelligence engines are consolidated into a best option decision before being input into an annotator to further confirm the best option decision. A recovery action to take during the disruption associated with the best option decision is automatically triggered by the system. The probability calculating artificial intelligence engines enhance the possible outcomes due to the various impacts of disruptions, which ultimately provide an optimized outcome, and result in triggering the correct solution for the production environment.

Embodiments of the present invention receive data from various sources, such as department, application owner, operation logs, etc. which are being analyzed for any abnormalities. Detection of an abnormality triggers an analysis of the data received containing the abnormality via the artificial intelligence engines. The artificial intelligence engines include a first AI engine that uses Baye's Theorem to calculate a probability of an outcome, a second AI engine that uses adaptive boosting, and a third AI engine that uses a bagging technique with random forests. An outcome is derived from each of the AI engines analyzing the data. The outcomes are consolidated into a single outcome, derived from the analysis, and is captured and run through an annotator engine to determine the best output. The best output is optionally run through the AI engines again to confirm the required recovery action associated with the best output. Based on the best output, the required recovery action is implemented in the production environment. In some embodiments, the recovery action output by the annotator is compared with recovery actions stored in an actions database to determine the appropriate action for accomplishing the recovery action in the production environment.

Referring to the drawings, FIG. 1 depicts a block diagram of a recovery action system 100, in accordance with embodiments of the present invention. The recovery action system 100 is a system for cognitively triggering recovery action decisions in a production environment. The recovery action system 100 calculates a probability of multiple outcomes during a component disruption within the production environment based on data inputs from components within the production environment using artificial intelligence engines. After determining the best or optimal outcome using the artificial intelligence engines, the recovery action system 100 triggers a recovery action within the production environment. Embodiments of the recovery action system 100 may be a cognitive recovery action system, a failover decision system, a cognitive resiliency tool for deciding whether to failover a component or an entire network to a disaster recovery environment, and the like.

The recovery action system 100 includes a computing system 120. Embodiments of the computing system 120 may be a computer system, a computer, a server, one or more servers, a backend computing system, and the like.

Furthermore, the recovery action system 100 includes a plurality of components 110a, 110b . . . 110n, and an actions database 113, which are communicatively coupled to the computing system 120 over a network 107. For instance, information/data is transmitted to and/or received from the components 110a, 110b . . . 110n, and the actions database 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 further comprises, in addition to the computing system 120, a connection to one or more network-accessible knowledge bases 114, which are network repositories containing information relating to component information, disruption history, failover percentages, production environment information, recovery actions, etc., network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 are a data collection area on the network 107 which backs up and saves all the data transmitted back and forth between the nodes of the network 107. For example, the network repository may be a data center saving and cataloging component information, disruption history, failover percentages, production environment information, recovery actions, and the like, to generate both historical and predictive reports regarding a particular production environment or component disruption. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 are a local repository that is connected to the computing system 120.

Embodiments of the components 110a, 110b . . . 110n are components and/or parts of a production environment. The reference numbers with sub-letters and/or ellipses, for example describing components as 110a, 110b . . . 110n signifies that the embodiments are not limited only to the amount of elements actually shown in the drawings, but rather, the ellipses between the letters and the $n^{th}$ element indicate a variable number of similar elements of a similar type. For instance, with regard to the components 110a, 110b . . . 110n depicted in FIG. 1, any number of a plurality of components may be present up to the $n^{th}$ number of components, wherein the variable "n" may represent the last element in a sequence of similar elements shown in the drawing. A component is a database, a core application, a critical server, a payment gateway, a banking application, a hardware device of the production environment, and the like. The components 110a, 110b . . . 110n are part of the production environment 115 shown schematically in FIG. 1. The product environment 115 is a real-time setting where one or more software applications are running, one or more servers are servicing requests from users of the system and accessing databases, and one or more databases are being performing reading/writing functions. The components 110a, 110b . . . 110n can each be divided up into smaller networks within the production environment 115.

Embodiments of the recovery action system 100 include an actions database 113. The actions database is a computer readable storage device communicatively coupled to the computing system 120. In one embodiment, the actions database 113 is coupled to the computing system 120, as shown in FIG. 1. In another embodiment, the actions database 113 is local to the computing system 120. Embodiments of actions database 113 may be a database or physical server system that stores required recovery actions for implementing recovery actions determined to be a best solution to a component disruption.

The recovery action system 100 further includes an annotator engine 117. The annotator engine extract concepts, words, phrases, classifications, and named entities from unstructured content and marks these extractions as annotations. The annotations are added to an index as tokens or facets and used as the source for content analysis. The annotator engine 117 annotates contents and defines relation types between them. The list of available relation types is then being broken down to define the outcomes. After finish annotating all the contents, a purified outcome will be created. An example of an annotator engine 117 as used with the recovery action system 100 is IBM WATSON® ANNOTATOR.

Furthermore, the computing system 120 of the recovery action system 100 is equipped with a memory device 142 which stores various data/information/code, and a processor 141 for implementing the tasks associated with the recovery action system 100. A recovery action application 130 is loaded in the memory device 142 of the computing system 120. The recovery action application 130 may be an interface, an application, a program, a module, or a combination of modules. In an exemplary embodiment, the recovery action application 130 is a software application running on one or more back end servers, servicing one or more production environments.

The recovery action application 130 of the computing system 120 includes a receiving module 131, a detection module 132, an AI module 133, and a recovery action module 134. A "module" refers to a hardware-based module, software-based module or a module that is a combination of hardware and software. Embodiments of hardware-based modules include self-contained components such as chipsets, specialized circuitry and one or more memory devices, while a software-based module is part of a program code or linked to the program code containing specific programmed instructions, which is loaded in the memory device of the computing system 120. A module (whether hardware, software, or a combination thereof) is designed to implement or execute one or more particular functions or routines.

Figure 2:
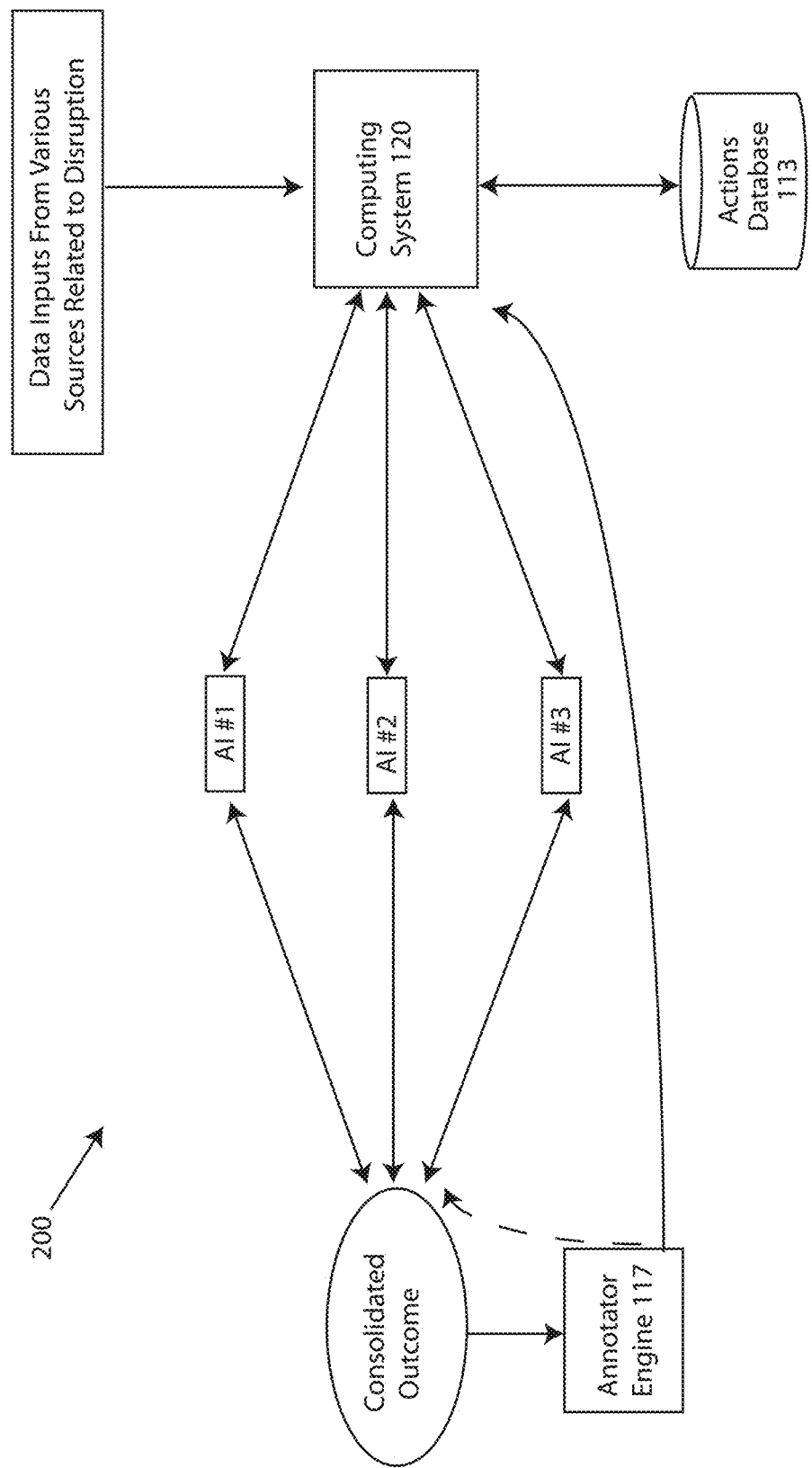
FIG. 2 depicts a schematic system diagram of the recovery action system, in accordance with embodiments of the present invention.

Embodiments of the receiving module 131 include one or more components of hardware and/or software program code for receiving data inputs from a plurality of components 110a, 110b . . . 10n comprising the production environment 115. FIG. 2 depicts a schematic system diagram of a recovery action system, in accordance with embodiments of the present invention. Data inputs from various sources, such as the components 110a, 110b . . . 110n of the production environment 115, is received by the receiving module 131 of the computing system 120. The data inputs include operation heat beats from applications, process watching scripts, CRON jobs, agent monitoring logs, departments, application owners, operation logs, etc. The data inputs are transmitted from the data sources to the receiving module 131 over network 107 during operation of the production environment. The flow of the data inputs to the receiving module 131 may be continuous during operation of the production environment for constant analysis of the production environment.

Referring back to FIG. 1, the detection module 132 includes one or more components of hardware and/or software program code for detecting an abnormality associated with a component of the plurality of components 110a, 110b . . . 110n by analyzing the data inputs. For instance, the detection module 132 analyzes the data inputs looking for any abnormality in the data by curating and formatting the data. An abnormality refers to any deviation from what is expected from the specific component within the production environment. An example of an abnormality is a data format of the data input that is different from a normal data format typically received from a specific component. Another example of an abnormality is related to a transaction time for various functions performed by a specific component within the production environment. If a component should complete a transaction within a certain amount of time (e.g. three seconds) but the transaction log indicates that the transaction did not complete or took longer than the normal amount of time (e.g. over three seconds), then the detection module 132 concludes that an abnormality has been detected and is associated with a specific component of the production environment. In response to detecting the abnormality, the detection module 132 triggers an analysis of the abnormality.

The computing system 120 also includes an AI module 133. The AI module 133 includes one or more components of hardware and/or software program code for analyzing the abnormality using a plurality of artificial intelligence engines to determine a plurality of outcomes from each artificial engine. The analysis by the plurality of artificial intelligence engines is triggered in response to detecting an abnormality by the detection module 131. As shown schematically in FIG. 2, the plurality of artificial intelligence engines includes three individual and different artificial intelligence engines, labeled as AI #1, AI #2, and AI #3, respectively, which are each used by the AI module 133 to determine an outcome from each of the artificial intelligence engines. Each artificial intelligence engine calculates a probability of an outcome associated with the abnormality of the component data. Examples of potential outcomes individual determined by the plurality of artificial intelligence engines include: trigger a disaster recovery because a database cannot be reached, check database because an associated software application is running without issue, check software application(s) because database is operating without issue, failover for entire production environment, increase the number of front end servers to cater for growing abnormality demand, failover only selected components of hardware and software to a disaster recovery site, wait for abnormality to cease without taking action, communicate that the affected system will not be available for certain amount of time without executing further actions, trigger a replacement order for specific components, change network path for the affected transactions, and delay activities of component for a period of time.

The different artificial intelligence engines include a first AI engine that uses Bayes' Theorem to calculate a probability of an outcome, a second AI engine that uses adaptive boosting, and a third AI engine that uses a bagging technique with random forests.

The first AI engine uses Bayes' Theorem to calculate the probability of an outcome given the value of a variable to calculate the probability of a hypothesis (h) being true, given prior knowledge (d). Bayes' Theorem is used as follows:

$$P(h|d)=(P(d|h)*P(h))/P(d)$$

where P(h|d) refers to posterior probability, h refers to hypothesis, and d refers to or known data. The probability of hypothesis h being true, given the data d, is determined as follows:

$$P(h|d)=P(d|h)*P(d2|h)* \ldots *P(dn|h)*P(d)$$

where P(d|h) refers to likelihood, the probability of data d given that the hypothesis h was true, P(h) refers to class prior probability, the probability of hypothesis h being true irrespective of the data; and P(d) refers to predictor prior probability, the probability of the data irrespective of the hypothesis.

The second AI engine is adaptive boosting (e.g. a machine learning meta-algorithm) that utilizes bagging and boosting techniques. Bagging is a parallel ensemble because each model is built independently. On the other hand, boosting is a sequential ensemble where each model is built based on correcting the misclassifications of the previous model. Bagging mostly involves 'simple voting', where each classifier votes to obtain a final outcome that is determined by the majority of the parallel models. Boosting involves 'weighted voting', where each classifier votes to obtain a final outcome that is determined by the majority, but the sequential models were built by assigning greater weights to misclassified instances of the previous models.

The third AI engine uses bagging with random forests. Random forest (i.e. multiple learners) is an improvement over bagged decision trees (i.e. a single learner). The first step in bagging is to create multiple models with datasets created using a Bootstrap Sampling method. The second step in bagging is to create multiple models by using the same algorithm on the different generated component sets. Unlike a decision tree, where each node is split on the best feature that minimizes error, in random forests, we choose a random selection of features for constructing the best split. The reason for randomness is, even with bagging, when decision trees choose a best feature to split on, they end up with similar structure and correlated predictions. But bagging after splitting on a random subset of features means less correlation among predictions from subtrees. The number of features to be searched at each split point is specified as a parameter to the random forest algorithm. Thus, in bagging with random forest, each tree is constructed using a random sample of records and each split is constructed using a random sample of predictors.

The AI module 133 thus uses the artificial intelligence engines to calculate a probability of an outcome associated with the abnormality of the component data. The AI module 133 also includes one or more components of hardware and/or software program code for consolidating the plurality of outcomes output from the AI engines into a single outcome. Each outcome of the AI engines is consolidated into the single outcome by appending all the contents into sequential formats based on the inputs from the AI engines, and specific format based on formatting Loader developed, which produces a consolidated outcome.

The single outcome is then input into an annotator engine 117 by the AI module 133 to determine the recovery action to take during the component disruption in the production environment 115, based on the different probabilities derived by the plurality of artificial intelligence engines. The recovery action output by the annotator engine 117 refers to the best outcome or most probable outcome, which is used to locate the actual recovery action stored in the actions database 113. Examples of recovery actions output by the annotator engine 117 includes recovering the component with the detected abnormality, recovering an entire network including the component with the detected abnormality, and failover to a disaster recovery environment so that the component with the detected abnormality runs in the disaster recovery environment. Prior to implementing the recovery action, the AI module 133 optionally confirms the recovery action output by the annotator engine 117 by inputting the recovery action determined by the annotator engine back through the plurality of artificial intelligence engines. Returning the recovery action output through the artificial intelligence engines confirms the probability that the recovery action will resolve the issues discovered by detecting the abnormality in the data inputs associated with a component within the production environment 115.

The computer system 120 also includes a recovery action module 134. The recovery action module 134 includes one or more components of hardware and/or software program code for implementing the recovery action specific to the component with the detected abnormality. For example, the recovery action module 134 automatically implements the recovery action to the component or a plurality of components within the production environment. In an exemplary embodiment, the recovery action module 134 uses the recovery action output by the annotator engine 117 and potentially confirmed by the AI engines to locate the actual recovery action stored in the actions database 113. In some cases, the recovery action is a failover of the component to a disaster recovery environment 116 from the production environment 115.

In a first example, computing system 120 can be used to resolve an unknown outage of a manufacturing system in a production environment. In this example, there is an unknown outage and all access to the manufacturing system and related automation tools has suddenly failed suddenly for unknown reasons. The detecting module 132 detects an abnormality associated with the manufacturing system by analyzing the data inputs received from the manufacturing system. The three artificial intelligence engines process the input information and a provide a decision on the best possible actions based on the different probabilities being derived.

The first AI engine produces the highest probability of a major outage to the manufacturing and recommends a fail over to the DR site. The first AI engine uses Baye's Theorem as follows:

$P(h|d)=(P(d|h)*P(h))/P(d)$ where.

$P(h|d)$=Posterior probability, the probability of hypothesis h being true, given the data d, where $P(h|d)=P(d1|h)*P(d2|h)* \ldots *P(dn|h)*P(d)$, $P(d|h)$=Likelihood. The probability of data d given that the hypothesis h was true. $P(h)$=Class prior probability, the probability of hypothesis ht being true (irrespective of the data), and $P(d)$=Predictor prior probability. Probability of the data (irrespective of the hypothesis). Unknown outage due to network unavailability is the likelihood for all access to fail suddenly. d means the event "all access to fail suddenly" and past analyzed data tells the first AI engine that 5% is due to network problems–$P(d)=0.05$. h means the likelihood that 10% of the "network problem" is related to the current segment where the manufacturing system is located $P(h)=0.1$ The analyzed data also shows that in the manufacturing system hosting in the current network segment, 30% are related to network problem, which is d|h; the probability that manufacturing system housed in the network segment, given that the network is not available, is 30%. Bayes' theorem thus tells the first AI Engine #1 that $P(d|h)=(0.3*0.1)/0.05=0.6$.

The second AI engine produces the probability of recovery of the manufacturing system by moving the workloads to another emergency Local Area Network (LAN) segment. The second AI engine uses adaptive boosting as follows: Given $(x\_1,y\_1), \ldots, (x\_m,y\_m)$ where $x\_i \in X$, $y\_i \in \{-1, +1\}$, wherein $\in$: "element of", $\{\ \}$: set, ex: if $A=\{1,2,3,7\}$, $2 \in A$ $(x\_1,y\_1)$: first training sample, $(x\_m,y\_m)$=m-th training sample. Given the training set containing m samples where all x inputs are an element of the total set X and where y outputs are an element of a set comprising of only two values, -1 (negative class) and 1 (positive class), $D1(i)=1/m$ for $i=1, \ldots, m$. Here, D=weights of samples and i=the i-th training sample, and all weights of the samples are initialized to 1, divided by number of training sample. For $t=1, \ldots, T$: train weak learner using distribution Dt Get weak hypothesis $h\_t: X \to \{-1, +1\}$, Aim: select h_t with low weighted error: $\in=Pr\_i \sim Dt\ [h\_t(xi) \text{ not equal to } y\_i]$ Choose $\alpha\_t=\frac{1}{2} \ln(1-\varepsilon/\varepsilon)$, and update for $i=1, \ldots, m$: $Dt+1(i)=Dt(i)\exp(-\alpha t*y\_i*h\_t(x\_i)/Zt$. Here, Pr=probability, h_t=hypothesis/classifier, $\varepsilon$=minimum misclassification error for the model, $\alpha$=weight for the classifier, exp=: euler's e: 2.71828, and Zt=normalization factor, used to ensure that weights represent a true distribution. With these notations in hand, the next portion is read as follows. For t=1 to T classifiers, fit it to the training data (where each prediction is either -1 or 1) and select the classifier with the lowest weighted classification error. The formula to formally compute $\varepsilon$ is described as follows:

$$\widetilde{MME}_{eng}^{(j)} = \frac{\sum_{i=1}^{N} w_i I(y_i \neq h_j(x_i))}{\sum_{i=1}^{N} w_i}$$

wherein, Σ=sum, y_i not equal to h_j=1 if misclassified and 0 if correctly classified, and w_i=weight. Thus, the formula reads: Error equals the sum of the misclassification rate, where weight for training sample i and y_i rot being equal to the prediction h_j (which equals 1 if misclassified and 0 if correctly classified). In this example, there are 4 different samples with weights 0.5, 0.2, 0.1 and 0.04. The classifier h predicted values 1, 1, −1, and −1, but the actual output value y was −1, 1, −1, 1: predicted: 1 1 −1 −1, actual: −1 1 −1 1, weights: 0.5 0.2 0.1 0.04, and 1 or 0: 1 0 0 1. Using the above, the second AI engine determines error due to the manufacturing system not being available because of the network, and need the manufacturing system needs to be recovered by moving the workloads to emergency LAN. The calculation supporting this prediction is calculated as follows: (0.5*1−0.2*0+0.1+0.0.4*1)/(0.5+0.2+0.1+0.04), and 0.64285714285.

The third AI engine produces the probability of recovery of the manufacturing system by moving the workloads to an alternate network segment. The third AI engine uses a bagging technique, which is an ensemble method of combining multiple predictors. For the predictor, L is a training set {x_i, y_i)|x_i in X, y_i in Y}, drawn from the set Λ of possible training sets. A predictor Φ: X→Y is a function that for any given x, it produces y=Φ(x). A learning algorithm Ψ: Λ→ Components that are given any L in Λ, it produces a predictor Φ=Ψ(L) in resolution options. There are several types of predictors, such as classifiers (different tables, loads, etc.), estimators (regression trees), and parsers. Further, the original training data is L, and thus the calculation is repeated X number of times. Get a bootstrap sample L_k from L, Train a predictor using L_k, and Combine B predictors by voting (for classification problem) and averaging (for estimation problem). A decision tree is created as follows:

TABLE 1

| Data Set L | Predictor - Resolution A | Predictor - Resolution B | Decision |
| --- | --- | --- | --- |
| Manufacturing System failed (Server not available, Network not available, Database (DB) fails, Middleware fails, etc.) | Moving the workloads to an alternate network segment | Do a test on the environment | Resolution A = 0.62 Resolution B = 0.4 |

Bagging Technique Tells AI Engine #2, Based on Resolution A=0.62

The annotator engine receives the outputs from the three AI Engines and consolidates them accordingly as follows: Resolution: The highest probability is that the problem can be solved in less than 2 hours, by fail over to DR site; Business Rule: The Recovery Time Objective (RTO) of the manufacturing system is 1 hour and return back to production after the problem is solved will need addition 1 hour of application check window. As such, total accumulated number of hours of outage is 2 hours; and The Annotator Engine Decision: Fail over the Manufacturing System from Production environment to DR site as it would achieve the minimum outage and still meet the agreed RTO of 2 hours. The output of the Annotation is then injected into the 3 AI Engines again, to derive a final outcome as follows: AI Engine #1: The highest probability of resolving the Manufacturing System outage is to fail over to DR site—using Baye's Theorem will produce the same weightage result based on this scenario; AI Engine #2: The highest probability of resolving the manufacturing system outage is to fail over to DR site—using Adaptive Boosting will produce the same weightage result based on this scenario; and AI Engine #3: The highest probability of resolving the Manufacturing System outage is to fail over to DR site—using Bagging technique will produce the same weightage result based on this scenario.

Accordingly, the annotator engine receives the revised final outputs and then activate the computing system 120, to trigger an integrated recovery system (e.g. Resiliency Orchestration, DR invocation Script, etc.) which provides the fail over of the manufacturing system from the production environment to DR site.

In a simplified second example, the computing system 120 can be used to resolve a database outage in a banking environment. The database (DB) on production System A has suddenly stopped responding. A Web Server keeps responding but sending out errors that the web server is unable to establish a connection with DB on production System A. The data received from the web server and DB of System A is analyzed and an abnormality is detected. In response to detecting the abnormality, AI Engine #1, AI Engine #2 and AI Engine #3 receive all the issues and related information of the production environment (i.e. database is down, web server is up, and all the other parameters regarding the network and the infrastructure are available). The Three AI Engines process the input information received and provide a decision on the best possible actions based on the different probabilities being derived, wherein: AI Engine #1 produces the highest probability of major disruption, and recommends to fail over to Disaster Recovery (DR) site, AI Engine #2 produces the probability of recovery the database in less than 4 hours, and AI Engine #3 produces the probability of recovery the database in less than 3 hours. The Annotator Engine receives the outputs from the three AI Engines and consolidates them accordingly as follows: Resolution: the highest probability is that the problem can be solved in less than 3 hours; Business Rule: the Recovery Time Objective (RTO) of the database is 4 hours and return back to production after the problem is solved will need addition 2 hours of maintenance window. As such, total accumulated number of hours of disruption is 6 hours; and the Annotator Engine Decision: do not fail over the database to DR site as the fail over action for production database would result a higher severity incident due to unable to achieve the agreed RTO. The output of the Annotation is then injected into the three AI Engines again, to derive a final outcome: AI Engine #1: the probability of resolving the database issue in less than 4 hours is the highest; AI Engine #2: the probability of resolving the database issue in less than 4 hours is the highest; and AI Engine #3: the probability of resolving the database issue in less than 4 hours is the highest. The outcome would ensure no triggering of process to fail over the database to the DR site but the injection of the required steps, to recover the database. The Annotator Engine receives the revised final outputs and thereafter triggers the recovery steps of the database to resolve the issues.

Various tasks and specific functions of the modules of the computing system 120 may be performed by additional modules or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Embodiments of the recovery action system 100 reduce a time that a production environment is potentially exposed to data abnormalities. Exposure to data abnormalities can be an indication that one or more components of the production environment is the subject of a cybersecurity attack. In the event of a cyberattack to the production environment, abnormalities detected are captured and analyzed that could result in automatically triggering a recovery action to block off the component with the abnormality or switch the component from the production environment to the disaster recovery environment or other alternative environment to prevent the cyberattack from spreading through the production environment.

Furthermore, the recovery action system 100 improves production environment monitoring and failover control. Without using the recovery action system 100, a user has to manually decide whether to failover to a disaster recovery area without knowledge of the probabilities of outcomes that determine the optimal solution. The recovery action system 100 provides a technical solution to the above-drawbacks because the system 100 processes multiple streams of information faster than any human decision process and automatically takes a recovery action output by artificial intelligence engines that modifies the production environment to prevent further damage to components of the production environment. The technical solution(s) described herein is necessarily rooted in computer technology in order to overcome a problem specifically arising in the realm of production environment monitoring and failover control. Further, the time that is saved by failing over sooner and automatically is critical for containing damage within a production environment.

Figure 3:
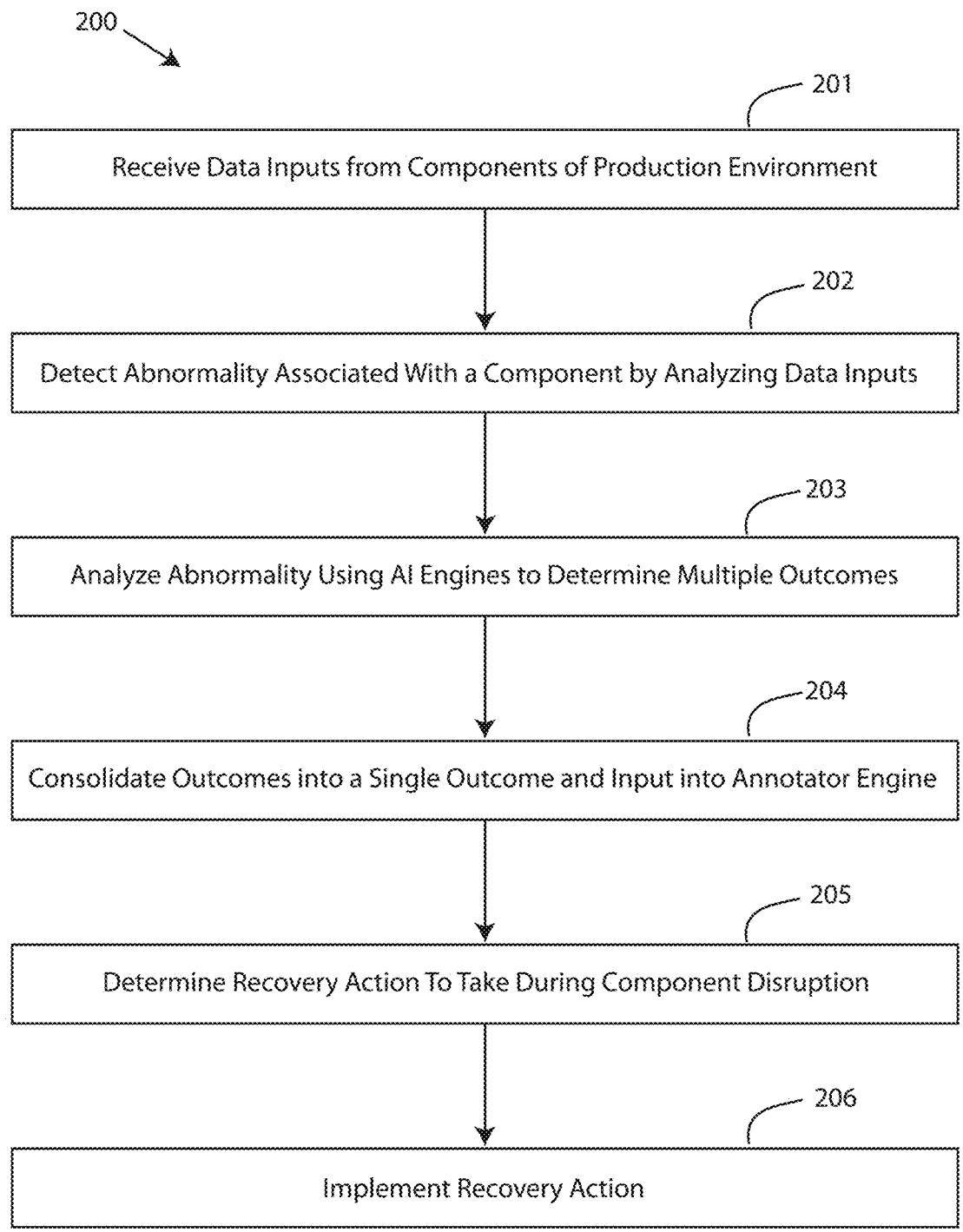
FIG. 3 depicts a flow chart of a method for triggering a recovery action during a component disruption in a production environment, in accordance with embodiments of the present invention.

Referring now to FIG. 3, which depicts a flow chart of a method 300 for triggering a recovery action during a component disruption in a production environment, in accordance with embodiments of the present invention. One embodiment of a method 300 or algorithm that may be implemented for triggering a recovery action during a component disruption in a production environment with the recovery action system 100 described in FIGS. 1-2 using one or more computer systems as defined generically in FIG. 5 below, and more specifically by the specific embodiments of FIG. 1.

Embodiments of the method 300 for triggering a recovery action during a component disruption in a production environment, in accordance with embodiments of the present invention, may begin at step 201 wherein data inputs are received from component of the production environment. Step 202 detects abnormalities associated with a component by analyzing the data inputs. Step 203 analyzes the abnormality using a plurality of AI engines to determine multiple outcomes. Step 204 consolidates outcomes into a single outcome and input into an annotator engine. Step 205 determines a recovery action to take during a component disruption. Step 206 implements the recovery action.

Figure 4:
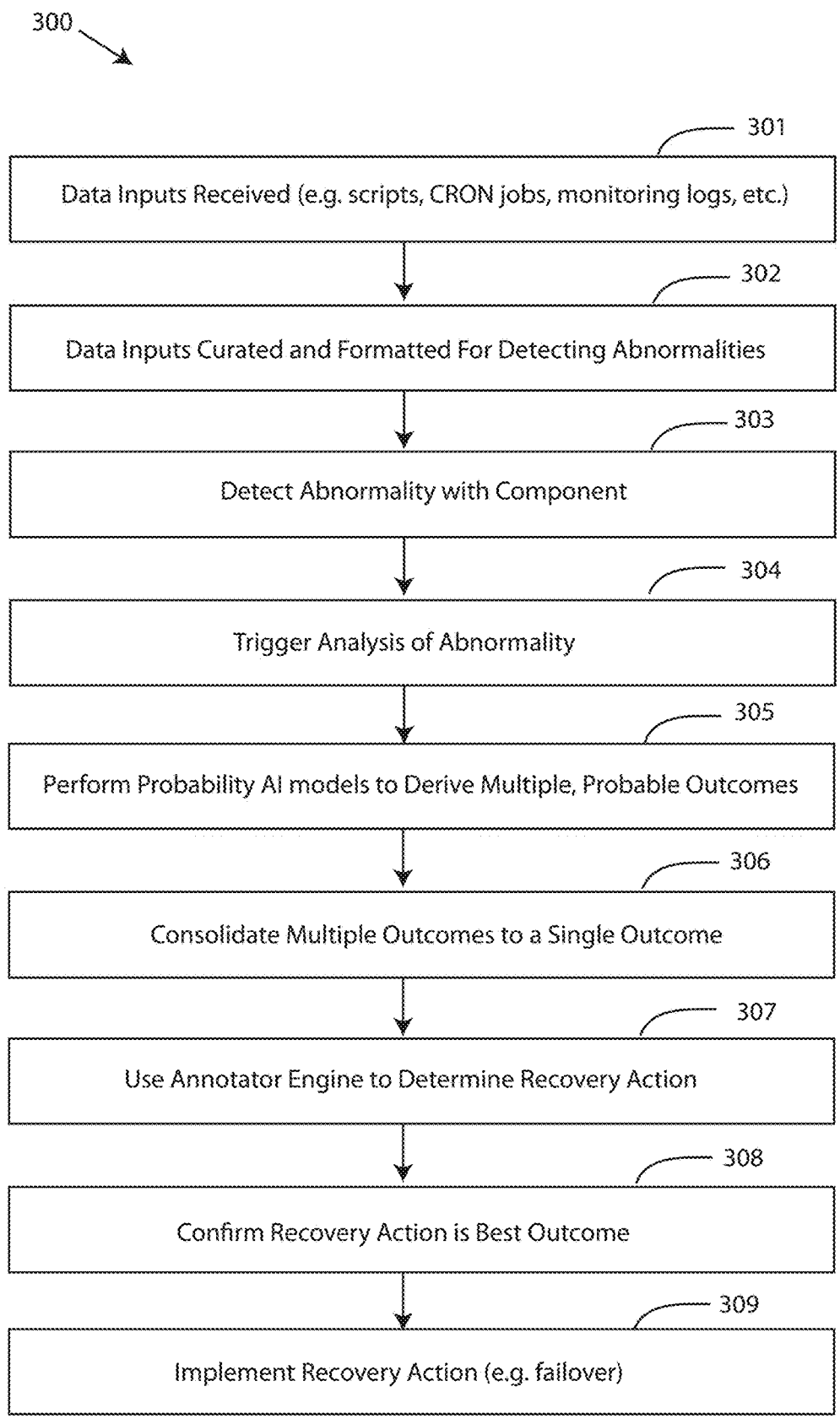
FIG. 4 depicts a more detailed flow chart of a method for triggering a recovery action during a component disruption in a production environment, in accordance with embodiments of the present invention.

FIG. 4 depicts a more detailed flow chart of a method 300 for triggering a recovery action during a component disruption in a production environment, in accordance with embodiments of the present invention. At step 301, data inputs are received. At step 302, the data inputs are curated and formatted for detecting abnormalities. At step 303, the abnormalities are detected. At step 304, an analysis of the abnormality is triggered, in response to the detection of the abnormality. At step 305, the AI engines calculate probabilities of various outcomes to derive multiple outcomes. At step 306, the multiple outcomes are consolidated into a single outcome. At step 307, the annotator engine determines a recovery action that correlates to the single outcome. At step 308, the recovery action is confirmed as the best outcome/recovery action by running the recovery action outcome through the AI engines a second time. At step 309, the recovery action is implemented to alter the production environment.

Figure 5:
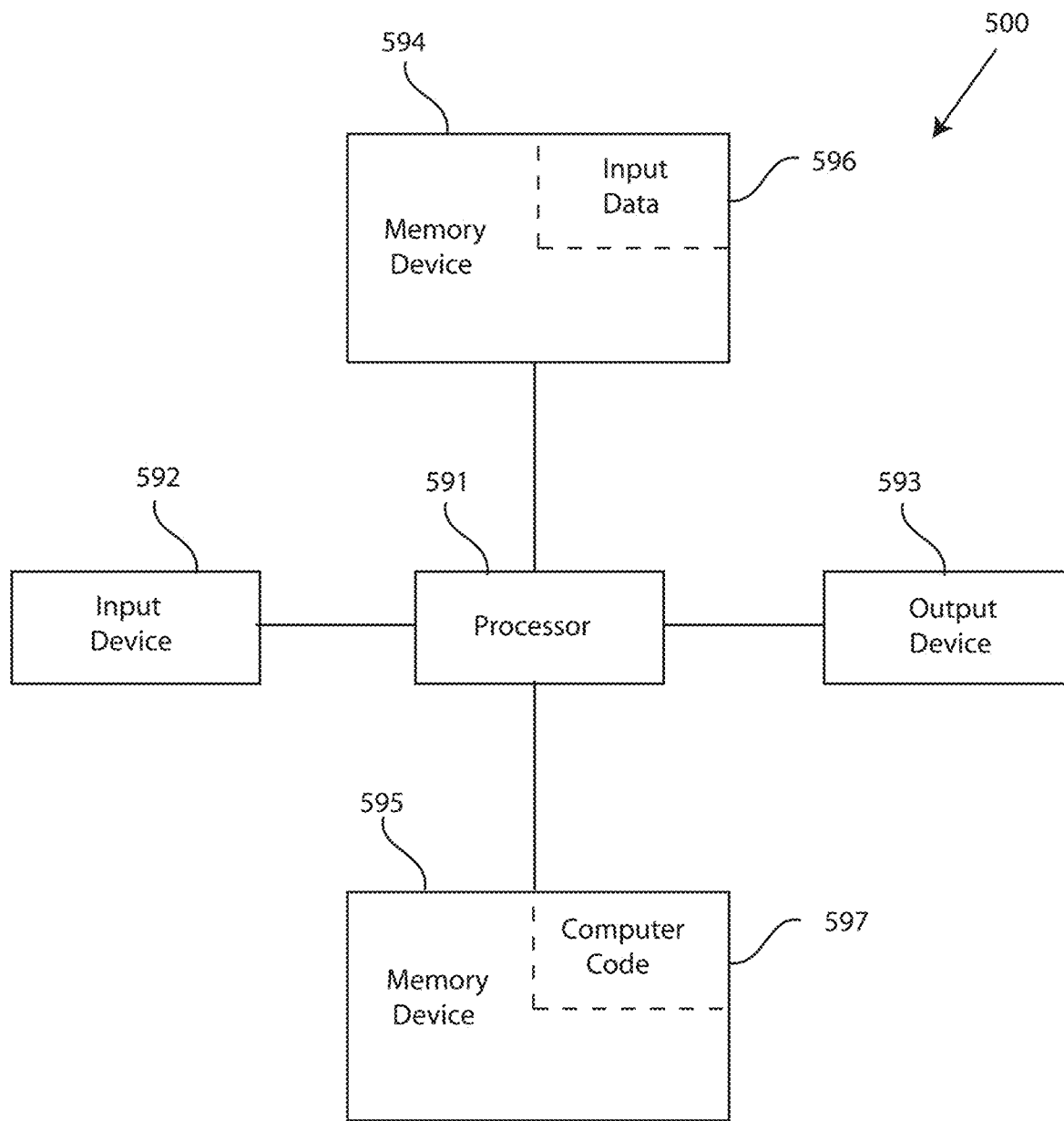
FIG. 5 depicts a block diagram of a computer system for the recovery action system of FIGS. 1-2, capable of implementing methods for triggering a recovery action during a component disruption in a production environment of FIGS. 3-5, in accordance with embodiments of the present invention.

FIG. 5 depicts a block diagram of a computer system for the recovery action system of FIGS. 1-2, capable of implementing methods for triggering a recovery action during a component disruption in a production environment of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for triggering a recovery action during a component disruption in a production environment in the manner prescribed by the embodiments of FIGS. 3-4 using the recovery action system 100 of FIGS. 1-2, wherein the instructions of the computer code 597 may be executed by processor 591 via memory device 595. The computer code 597 may include software or program instructions that may implement one or more algorithms for implementing the method for triggering a recovery action during a component disruption in a production environment, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices

594, 595 may include an operating system (not shown) and may include other systems not shown in FIG. 5.

In some embodiments, the computer system 500 may further be coupled to an Input/Output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to recovery actions for production environment control. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to trigger a recovery action during a component disruption in a production environment. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for triggering a recovery action during a component disruption in a production environment. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for triggering a recovery action during a component disruption in a production environment.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
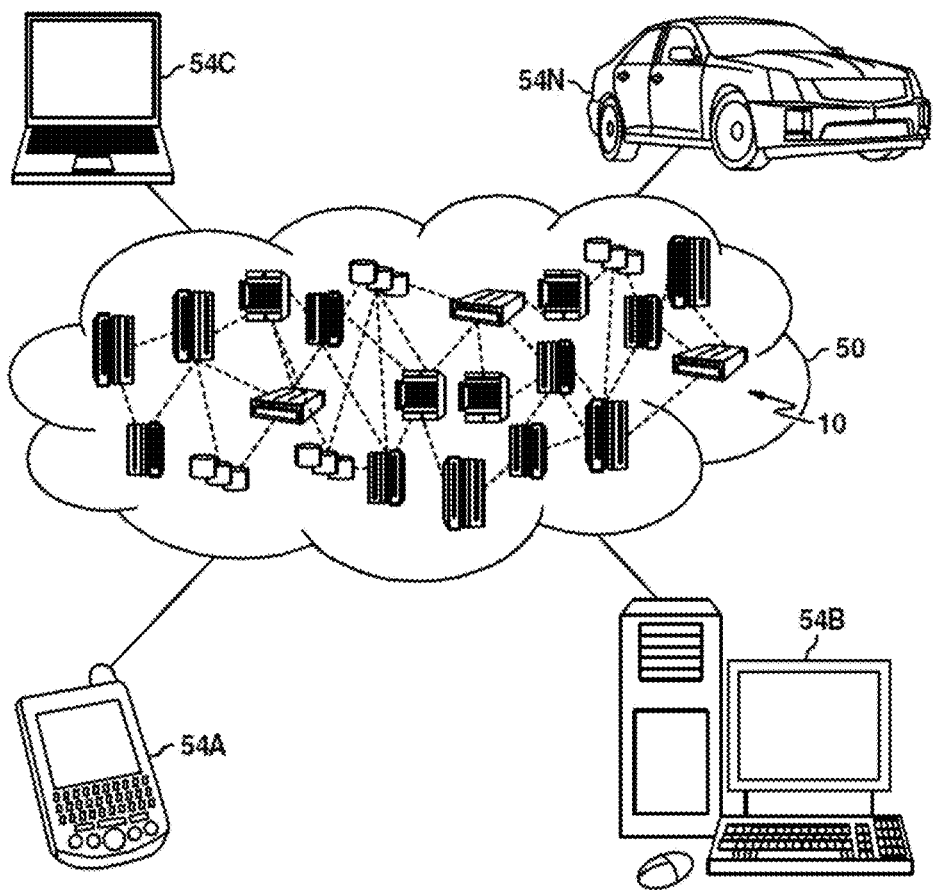
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
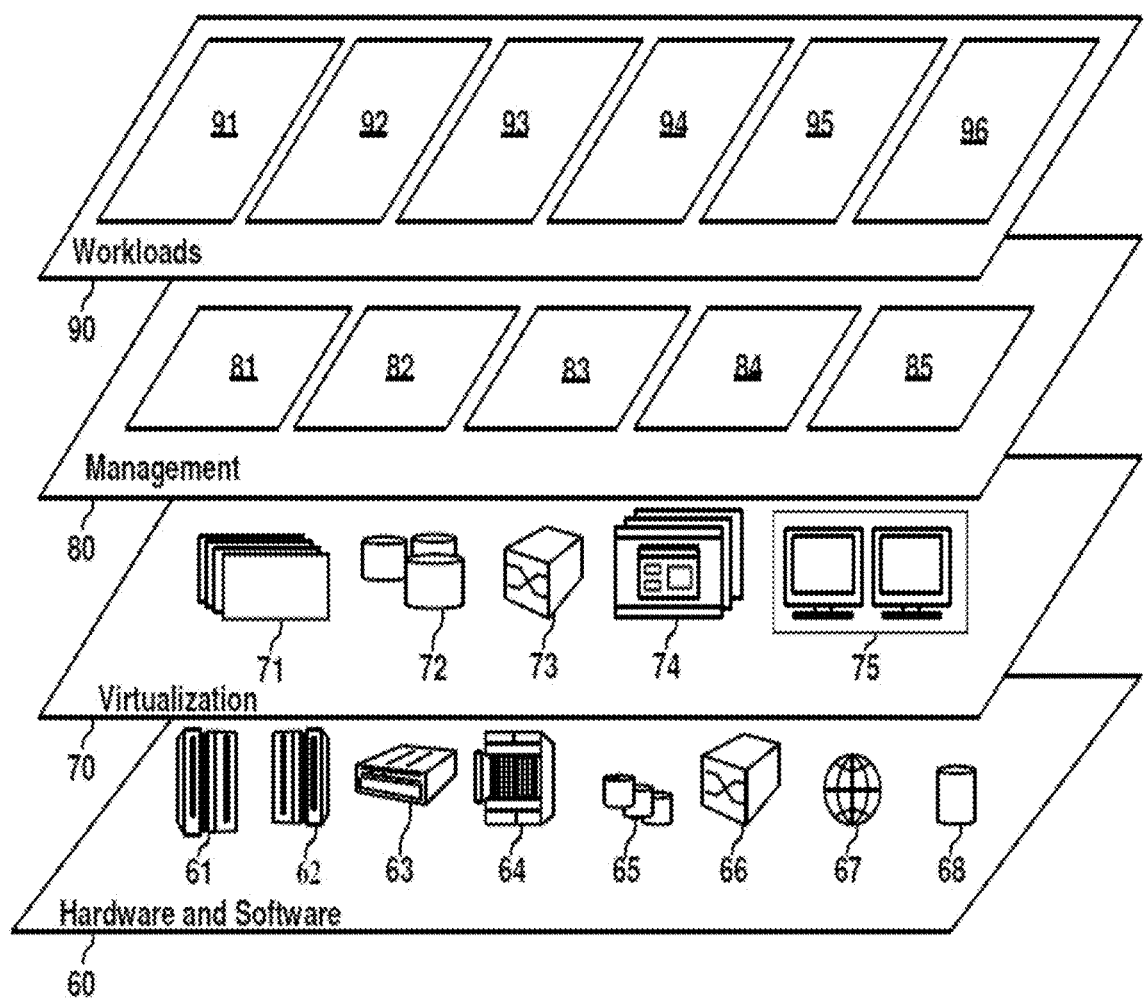
FIG. 7 depicts abstraction model layers, in accordance with embodiments of the present invention.

Referring now to FIG. 7 a set of functional abstraction layers provided by cloud computing environment 50 (see FIG. 6) are shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recovery actions for production environments 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for triggering a recovery action during a component disruption in a production environment, the method comprising:
   receiving, by a processor of a computing system, data inputs from a plurality of components comprising the production environment;
   detecting, by the processor, an abnormality associated with a component of the plurality of components by analyzing the data inputs, and in response to the detecting the abnormality, triggering an analysis of the abnormality;

analyzing, by the processor, the abnormality using a plurality of artificial intelligence engines to determine a plurality of outcomes from each artificial intelligence engine;

consolidating, by the processor, the plurality of outcomes into a single outcome, the single outcome being input into an annotator engine to determine the recovery action to take during the component disruption in the production environment;

inputting, by the processor, the recovery action output by the annotator engine through the plurality of artificial intelligence engines that determined the plurality of outcomes, to confirm the recovery action to take; and implementing, by the processor, the recovery action specific to the component with the detected abnormality.

2. The method of claim 1, wherein the plurality of artificial intelligence engines each calculate a probability of the plurality of outcomes, prior to being input into the annotator engine.

3. The method of claim 1, wherein the recovery action is selected from the group consisting of recovering the component with the detected abnormality, recovering an entire network including the component with the detected abnormality, and failover to a disaster recovery environment so that the component with the detected abnormality runs in the disaster recovery environment.

4. The method of claim 1, wherein the plurality of outcomes is selected from the group consisting of: trigger a failover action for the component, check the component to verify that the component needs to be recovered, and check an application running on the component.

5. The method of claim 1, wherein the component is selected from the group consisting of: a database, a core application, a critical server, a payment gateway, a banking application, and a hardware device of the production environment.

6. The method of claim 1, wherein the recovery action is a failover of the component to a disaster recovery environment from the production environment.

7. A computing system, comprising:
a processor;
a memory device coupled to the processor; and
a computer readable storage device coupled to the processor, wherein the storage device contains program code executable by the processor via the memory device to implement a method for triggering a recovery action during a component disruption in a production environment, the method comprising:
receiving, by the processor, data inputs from a plurality of components comprising the production environment;
detecting, by the processor, an abnormality associated with a component of the plurality of components by analyzing the data inputs, and in response to the detecting the abnormality, triggering an analysis of the abnormality;
analyzing, by the processor, the abnormality using a plurality of artificial intelligence engines to determine a plurality of outcomes from each artificial intelligence engine;
consolidating, by the processor, the plurality of outcomes into a single outcome, the single outcome being input into an annotator engine to determine the recovery action to take during the component disruption in the production environment;
inputting, by the processor, the recovery action output by the annotator engine through the plurality of artificial intelligence engines that determined the plurality of outcomes, to confirm the recovery action to take; and
implementing, by the processor, the recovery action specific to the component with the detected abnormality.

8. The computing system of claim 7, wherein the plurality of artificial intelligence engines each calculate a probability of the plurality of outcomes, prior to being input into the annotator engine.

9. The computing system of claim 7, wherein the recovery action is selected from the group consisting of recovering the component with the detected abnormality, recovering an entire network including the component with the detected abnormality, and failover to a disaster recovery environment so that the component with the detected abnormality runs in the disaster recovery environment.

10. The computing system of claim 7, wherein the plurality of outcomes is selected from the group consisting of: trigger a failover action for the component, check the component to verify that the component needs to be recovered, and check an application running on the component.

11. The computing system of claim 7, wherein the component is selected from the group consisting of: a database, a core application, a critical server, a payment gateway, a banking application, and a hardware device of the production environment.

12. The computing system of claim 7, wherein the recovery action is a failover of the component to a disaster recovery environment from the production environment.

13. A computer program product, comprising a computer readable hardware storage device storing a computer readable program code, the computer readable program code comprising an algorithm that when executed by a computer processor of a computing system implements a method for triggering a recovery action during a component disruption in a production environment, the method comprising:
receiving, by the processor, data inputs from a plurality of components comprising the production environment;
detecting, by the processor, an abnormality associated with a component of the plurality of components by analyzing the data inputs, and in response to the detecting the abnormality, triggering an analysis of the abnormality;
analyzing, by the processor, the abnormality using a plurality of artificial intelligence engines to determine a plurality of outcomes from each artificial intelligence engine;
consolidating, by the processor, the plurality of outcomes into a single outcome, the single outcome being input into an annotator engine to determine the recovery action to take during the component disruption in the production environment;
inputting, by the processor, the recovery action output by the annotator engine through the plurality of artificial intelligence engines that determined the plurality of outcomes, to confirm the recovery action to take; and
implementing, by the processor, the recovery action specific to the component with the detected abnormality.

14. The computer program product of claim 13, wherein the plurality of artificial intelligence engines each calculate a probability of the plurality of outcomes, prior to being input into the annotator engine.

15. The computer program product of claim 13, wherein the recovery action is selected from the group consisting of recovering the component with the detected abnormality, recovering an entire network including the component with the detected abnormality, and failover to a disaster recovery environment so that the component with the detected abnormality runs in the disaster recovery environment.

16. The computer program product of claim 13, wherein the plurality of outcomes is selected from the group consisting of: trigger a failover action for the component, check the component to verify that the component needs to be recovered, and check an application running on the component.

17. The computer program product of claim 13, wherein the recovery action is a failover of the component to a disaster recovery environment from the production environment.

* * * * *